United States Patent [19]

Stamper et al.

[11] Patent Number: 5,080,377
[45] Date of Patent: Jan. 14, 1992

[54] VIDEO DISPLAY SYSTEM

[75] Inventors: Timothy D. J. Stamper, Leicestershire; Christopher T. J. Stamper, Twycross Warks, both of England

[73] Assignee: Rare Coin-It, Inc., Miami, Fla.

[21] Appl. No.: 531,384

[22] Filed: May 31, 1990

[51] Int. Cl.$^5$ .............................................. A63F 9/22
[52] U.S. Cl. .................................... 273/437; 273/434; 273/85 G; 273/DIG. 28; 340/724; 340/720
[58] Field of Search ............ 273/DIG. 28, 85 G, 433, 273/434, 437; 340/721, 720, 723, 724, 725, 726, 728; 364/410

[56] References Cited

U.S. PATENT DOCUMENTS

| | | | |
|---|---|---|---|
| 4,162,792 | 7/1979 | Chang et al. | 273/85 G |
| 4,359,223 | 11/1982 | Baer et al. | 273/85 G |
| 4,484,192 | 11/1984 | Seitz et al. | 340/721 |
| 4,672,541 | 6/1987 | Bromley et al. | 273/1 E |
| 4,738,451 | 4/1988 | Logg | 273/153 R |

FOREIGN PATENT DOCUMENTS 2849405 5/1979 Fed. Rep. of Germany ... 273/DIG. 28

OTHER PUBLICATIONS

Advertisement for Mattel Intellivision, 1982.

Primary Examiner—Edward M. Coven
Assistant Examiner—Jessica J. Harrison
Attorney, Agent, or Firm—Christensen, O'Connor, Johnson & Kindness

[57] ABSTRACT

A video display system for displaying an oversized playing field on a video display is disclosed. The playing field includes opposing boundaries and a control component. The control component interacts with one or more playing tokens. The system identifies a playing window including the portion of the playing field that includes the playing token that is closest to the control component. The playing window portion of the playing field and the portion of the playing field including the control component are displayed. In this manner, the display always includes the control component and the playing token closest thereto so that the player can visually relate the two aspects of the game.

13 Claims, 4 Drawing Sheets

VIDEO DISPLAY SYSTEM,

TECHNICAL AREA

The present invention is directed toward video display systems, and more particularly, to a system for displaying an elongated playing field in a video game to produce a realistic display.

BACKGROUND OF THE INVENTION

The video display is one very important aspect of a video game. It is important for displays to be realistic as well as technically efficient in their presentation of a game. One popular type of home video game system includes a control system connected to a standard television. Certain aspects of the video display in such a system are limited by the quality and size of the television. However, other aspects of the display can be controlled by the game system to enhance the quality of the player interaction with the game.

In typical video games, the player controls some aspect of the game, such as the movement of a playing token, the firing of shots, the selection of play sequences, etc. Player interaction is also an important aspect of a video game. It is important to maintain the player's interest in interacting with the game.

In many games, a single background appears throughout the game. The background dimensions are dictated by the size of the screen. One or more playing tokens, such as a ball, a figure, etc., appear on the background, and/or move in and out of the display. In another type of game, the background itself moves relative to the display. For example, in car race games the background is a track. The track and/or the car (playing token) may move about the display screen. In such games, the playing token as well as the background may move, or the playing token may be stationary while the background moves. Many of these games provide backgrounds that are relatively unbounded, e.g., continuous tracks, outerspace, landscapes, jungles, etc.

In some games, the background represents a playing field, such as a baseball diamond, a hockey rink, etc. In most video game systems, the entire playing field is depicted at one time on the video display. Such displays, particularly if they are limited to the dimensions of a typical television screen or arcade video game monitor, suffer from lack of realism. For example, a television screen's shape is not proportional to a hockey rink. One solution to this problem is to provide a specialized video display device for the game such as an elongated screen. This solution is generally implemented only with small hand-held games which are less expensive to produce than the home video systems and arcade games. Another common solution is to window a portion of the playing field for display. In this manner, the portion of the playing field including the primary playing token, e.g., a ball, is displayed. The non-windowed portion of the playing field, possibly including secondary playing tokens, is not displayed. In one example, a close-up view of a baseball pitcher and batter is displayed while the ball play is initiated. If the ball is hit out of the infield, the display is abruptly changed to include a view of the entire field.

Another problem with video games in which the background represents a playing field is that the user often interacts with the playing token via a control component that appears on the display. For example, in a pinball video game, the player interacts with the ball via a plunger that initiates the ball play and a set of flippers that keep the ball in play. Another example is a ping pong video game in which the player interacts with the ball via a paddle component that is repositionable along one boundary of the playing field in order to intercept the ball.

One possible configuration of a pinball game that has an elongated playing field and a set of control components is to split the playing field into an upper field and a lower field. The combination of two fields represents an entire pinball field. The lower field includes the plunger and flippers. A screen swapping method is used to display the portion of the pinball field on which the ball is currently positioned. For example, as the ball play is initiated, the lower field is visible. After the plunger initiates the play of the ball, the ball travels to the top of the pinball field and thus the upper field must be swapped into the display. The ball moves down through the upper field; when it reaches the bottom of that field, the entire field is replaced by the lower field. Such a display method does not create a realistic impression of the play of a pinball game. Further, the user loses the visual relationship between the control components and the ball and is also prevented from interacting with the game when the upper field is presented since the flippers are no longer displayed.

To increase the realism of video games, it is preferable to represent the playing field in dimensions proportional to its common dimensions. To increase the ease and enjoyment of play, it is desirable to allow the player to constantly view and use the control components. The present invention solves this and other problems in the prior art.

SUMMARY OF THE INVENTION

The system and method of the present invention provides a video display system for generating a realistic playing field display of a playing field that is disproportionally dimensioned in relation to the screen. The playing field has opposing boundaries and a control component having a fixed playing field position. The control component interacts with a playing token. The portion of the field including the control component is continuously displayed. A playing window of the playing field, which includes the playing token, constantly appears on the video display. The playing window portion of the playing field is identified by the system for display. In this manner, the entire playing field can be displayed in a scrolling manner, i.e., in the playing window, so that the player can track the relationship between the playing token and the control component at all times.

In a game including multiple playing tokens, the system first determines which playing token is closet on the playing field to the control component. The playing window is then adjusted to include the closest token in the playing window.

In accordance with other aspects of the present invention, the system of the present invention is included in a pinball video game system. The flipper and plunger controls are included in the control component portion of the playing field and are constantly displayed under the control of a main control program. Instructions are generated by the system that identify a playing window that includes the ball on the playing field that is positioned closest to the control component. The instructions are utilized by the main control program to display the appropriate portion of the playing field window.

The video game thus includes a playing field background, a portion of which is stationary and a portion of which scrolls along the playing field so that the ball on the playing field closest to the control component is always visible.

BRIEF DESCRIPTION OF THE DRAWINGS

The foregoing abstracts and the attendant advantages of this invention will become more readily appreciated and the same become better understood by reference to the following detailed description, when taken in conjunction with the accompanying drawings, wherein.

DETAILED DESCRIPTION OF THE PREFERRED EMBODIMENT

The system of the present invention is particularly useful in a video game that depicts an oversized playing field that has at least two opposing boundaries between which a playing token moves and has a control component that is fixed on the playing field. The term "oversized" refers to the fact that the playing field is proportionally larger between the two boundaries than the video display screen; only a portion of the playing field can be displayed at one time. Normally, in order to display such a playing field, the playing field dimensions would be altered, the display would be warped, and/or a screen swapping mechanism would display discrete parts of the playing field one part at a time.

In one actual embodiment of the system, a computer program routine is used in a pinball video game. The main control program generates a display wherein that portion of the playing field including the plunger and flippers is always displayed along the bottom of the video display. The remainder of the video display is filled with a portion of the playing field identified by a playing window. The identification of the playing window position relative to the entire playing field is performed by the routine.

Generally, the routine determines whether the playing token is near the bottom of the playing window. If so, the routine determines whether the playing window is at its furthest position down in the playing field, e.g., adjacent the control component portion of the playing field. If the window is adjacent the control component, then no window adjustment information is generated. However, if the window is not at its farthest position down, window adjustment information is generated for the main control program.

If the playing token is not near the bottom of the playing window, the routine tests whether the playing token is near the top of the window. If the playing token is near the top of the window, a check is made to determine whether the window is at the playing field upper boundary. If it is, then no window adjustments are calculated. However, if the window is not at the upper boundary, then window adjustment information is generated.

Using this method, the player can always see the ball and the flippers, no matter where the ball is positioned on the playing field. In some instances, the background playing field will move relative to the ball. However, when the playing window is positioned adjacent the playing field upper boundary or the control component, the background is stationary.

Figure 1:
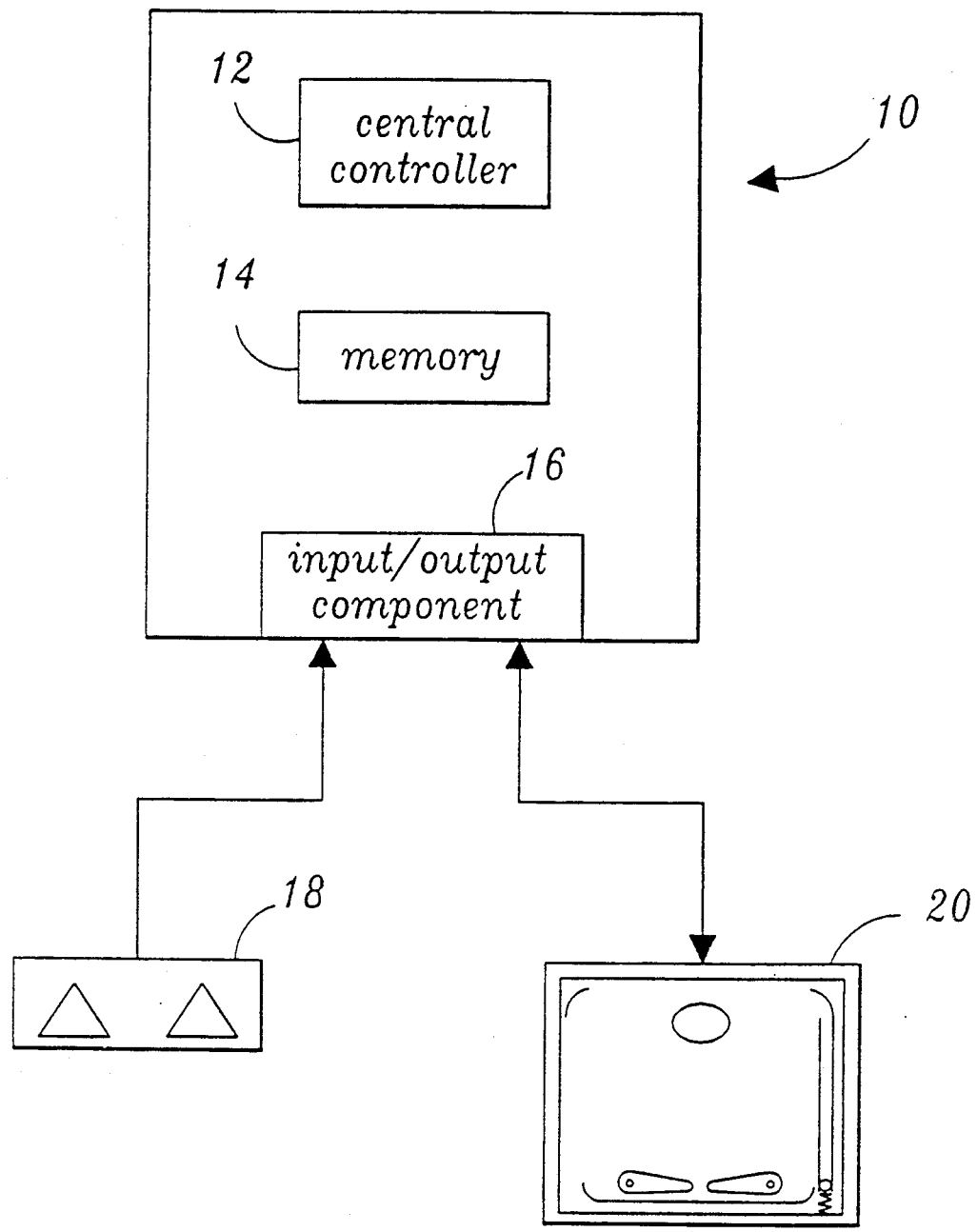
FIG. 1 is a block diagram of a video game system in which the system of the present invention can be integrated.

In one preferred embodiment, with reference to FIG. 1, the routine is integrated into a video game system 10 including a central controller 12, memory 14, and an input/output component 16. The main control program, including the routine of the present invention, is stored in the memory. The main control program controls token and background movement, processes input and output, etc. The main control program generates information related to playing token status and position, and playing window position. The central controller executes the main control program. The input/output component includes user controls, such as control box 18, and a video display 20. The input/output component receives command instructions from a player corresponding to control component movements. The input/output component outputs signals to drive the video display (e.g., the background display, token movement, and control component movement).

In one actual embodiment, the routine is integrated into a main control program that is executed on an interrupt basis. The interrupt is generated by a screen rewriting (refreshing) routine. Each time the video display is rewritten, the main control program is executed. This provides a smooth flow of playing field movement.

Figure 2A:
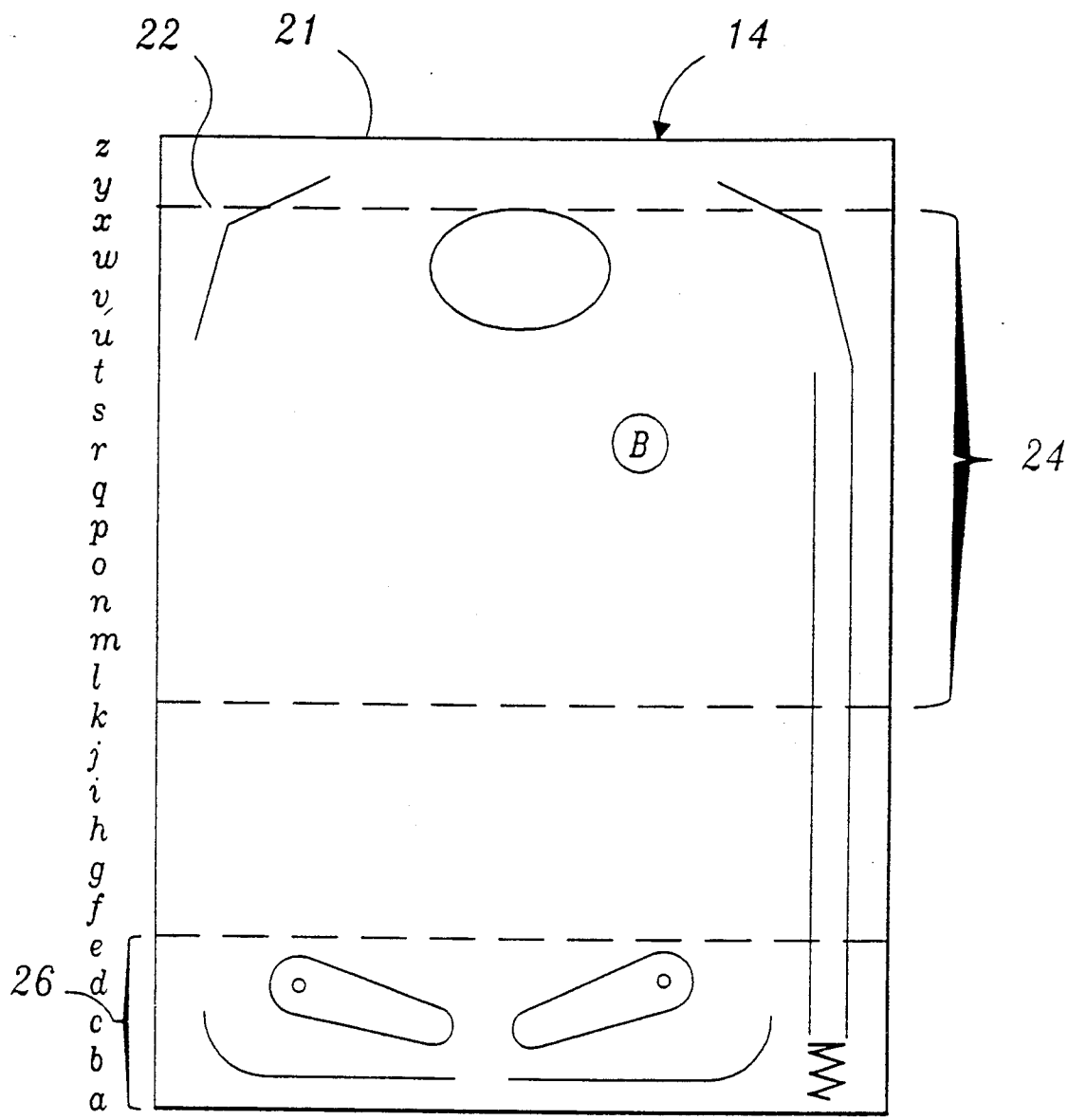
FIGS. 2A-C are schematic diagrams of the relationship between th playing field and a video display in accordance with the present invention.

With reference to FIG. 2A, the display data describing the playing field 21 may be stored in the memory 14 at addresses *a through z*. The playing window 22 (shown in reference) includes 13 rows of characters. The playing window is also referred to as segment 24. Segment 26 of the playing field includes the control component and is constantly displayed. The playing window 22 is thus positionable between addresses *f-z*. Segment 24 includes the active ball B and will output to the input/output component for display. The data is actually stored in the memory in digital form; each data entry is a set of binary bits describing a pixel. A variety of methods are well known for converting digital image data, such as that represented by playing field 21, into analog data that can drive a video display.

Figure 2C:
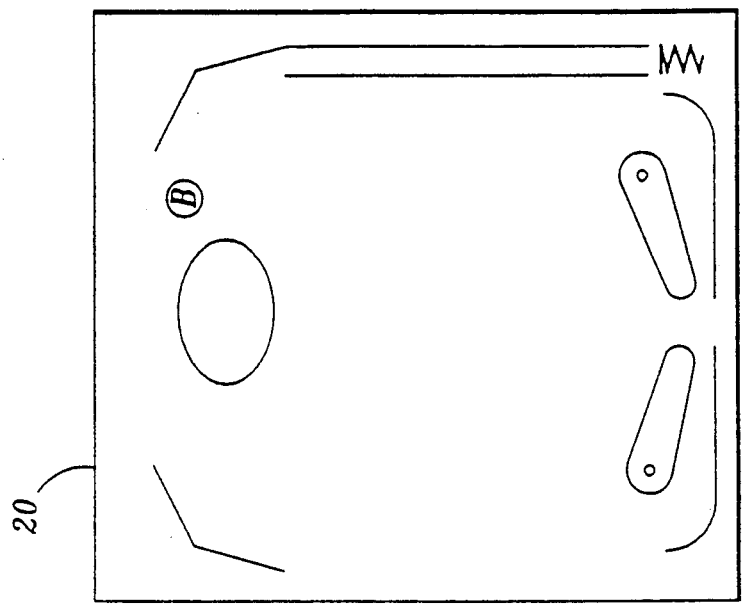
Figure 2B:
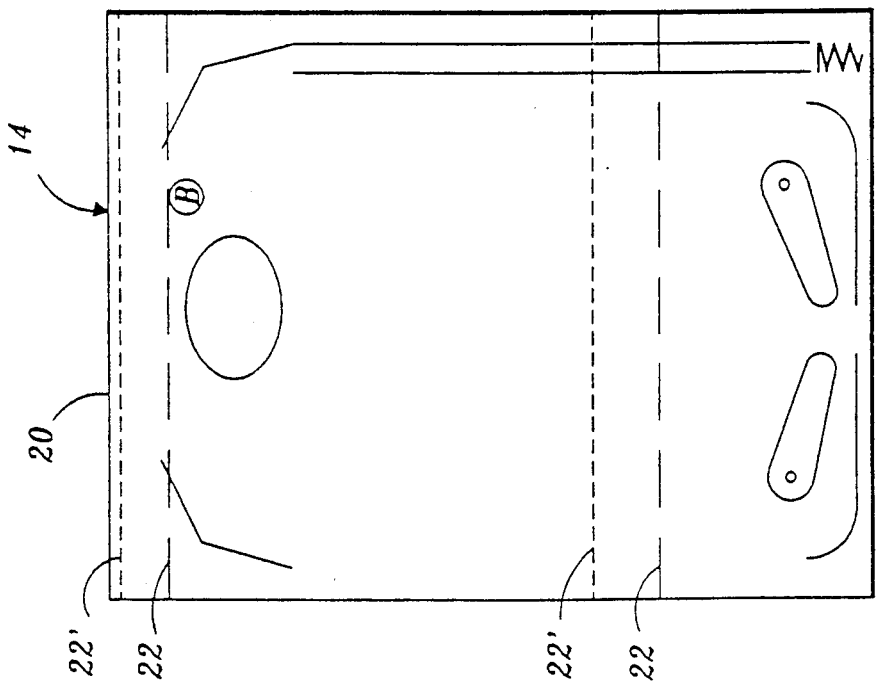

With reference to FIG. 2B, in an example of actual play, the ball B has moved nearer to the top of the playing window 22. In order to maintain the ball on the video display, the routine of the present invention adjusts the position of the playing window 22 upwardly to window 22' (shown in +) relative to the playing field. A display generated in accordance with the adjusted window position is shown in FIG. 2C.

In one preferred embodiment, multiple playing tokens may appear on the screen. For example, in a pinball video game, the player generally begins with one ball. During play, bonus balls may be awarded and appear immediately on the playing field. In this case, it is necessary to monitor the position of the lowest ball in the playing window since that ball is closest to the control component. The routine determines how many balls are active, determines which active ball is lowest in the playing window, determines the position of the lowest ball in the window, and adjusts the window accordingly.

Figure 3:
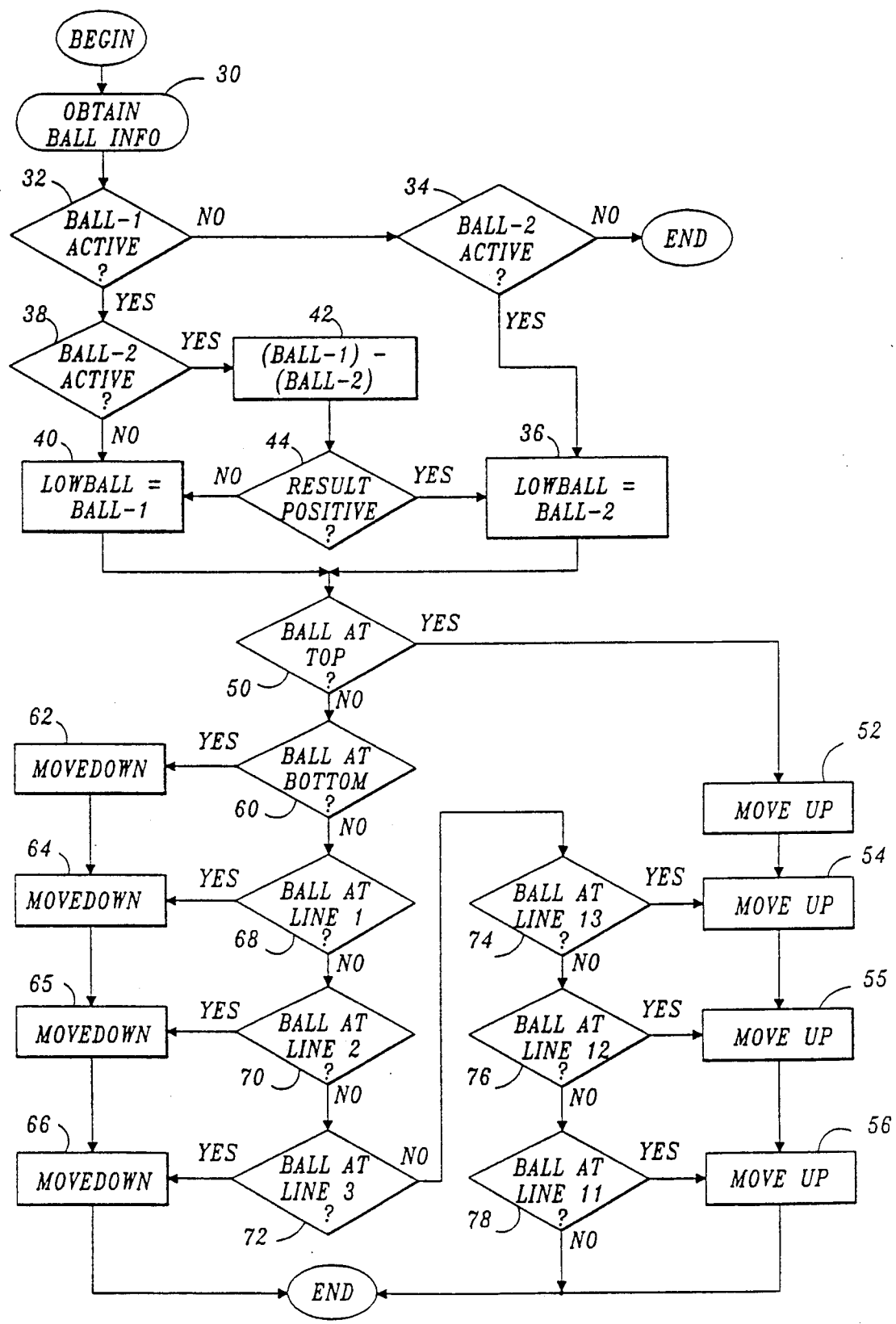
FIG. 3 is a flow diagram of a system in accordance with the present invention.

With reference to FIG. 3, at block 30, the routine obtains ball information from the main program for *ball*-1 and *ball*-2. The information includes whether the ball is active and its position in the playing window. At block 32, a check is made to determine whether *ball-1* is active. If the ball is not active, then *ball-2* is considered to be the lowest ball. At block 34, a check is made to determine whether *ball-2* is active. If the ball is not active, then neither of the balls are on the playing field and the routine is ended. If *ball-2* is active, then it is set as the *low-ball* at block 36.

If, at block 32, *ball-1* is active, then at block 38 a check is made to determine whether *ball-2* is also active. If *ball-2* is not active, then *ball-1* is set as the *low-ball* at block 40. Otherwise, both balls are active and at block 42 the ball positions are compared to determine which is lowest in the playing window and, thus, which is closest to the control component. The relative positions are determined by subtracting the position of *ball-2* from the position of *ball-1*. If the result is positive at block 44, then *ball-2* is set as the *low-ball* at block 36. Otherwise, *ball-1* is set as the *low-ball* at block 40.

Once the *low-ball* is determined, at block 50, the ball position is compared to the top of the window. If the ball is at the top of the window, a subroutine designated as MOVEUP to generate window position informartion is called at block 52. In particular, the MOVEUP subroutine determines a new window position that is one row of characters "up" from the previous positions. When the results of the subroutine MOVEUP are processed by the main control program, the playing window display is repositioned one character up on the playing field. When the subroutine MOVEUP returns, it is then again called at blocks 54, 55, and 56. Thus, if the ball position is at the top of the playing window, the window is moved up four characters. After this series of moves, the ball will be more centrally located within the playing window. At the end block; the routine is completed. Using the playing window adjustment information generated by the MOVEUP routine, the main control program outputs the appropriate segment of the playing field for display and adjusts the ball position accordingly.

If, at block 50, the position of the ball is not at the top of the window, a test is performed at block 60 to determine whether the ball is positioned at the bottom of the playing window. If it is, a subroutine designated as MOVEDOWN to generate instructions to move the window down a character is called at block 62. Again, upon return from the MOVEDOWN subroutine, the subroutine is again called at blocks 64, 65, and 66. Thus, if the ball is positioned at the bottom of the window, the window is moved down four characters to more centrally locate the ball within the playing window.

If the ball is not at the top or bottom of the playing window, a series of checks are made to determine whether the ball is near the top or the bottom of the playing window. If so, appropriate window adjustment instructions are generated. If the ball is within a central portion of the playing window, no window adjustment instructions are generated.

As an example of the tests, at block 68, if the ball is on the first line of the playing window, the routine calls the MOVEDOWN subroutine three times at blocks 64, 65, and 66. Similarly, at block 70, if the ball is on the second line, the MOVEDOWN subroutine is called twice, at blocks 65 and 66. A similar check occurs at block 72 to determine whether the ball is on the third line.

If the ball is not on the first, second, or third line from the bottom of the playing window, the routine checks the position of the ball relative to the top of the window. At block 74, if the ball is on the thirteenth line from the bottom of the window, the MOVEUP subroutine is called three times, at blocks 54, 55, and 56. Similar checks and calls to the MOVEUP subroutine are performed at blocks 76 and 78. Using this particular routine, if the ball is between lines 3 and 10 of the playing window, no adjustment instructions are generated.

The MOVEUP and MOVEDOWN subroutines include a check to determine whether the upper edge of the playing window is at its highest position in the playing field and whether the lower edge of the playing window is at its lowest position in the playing field, respectively. If either of these conditions is true, then no window adjustment instuctions are generated.

Using this routine, the lowest ball in the playing window will always appear in the playing window. However, the higher ball in the playing window may move in and out of the display at the top edge. This does not affect the player's ability to interact with the balls since the low-ball will always be the first ball that the player must attend to. Since the routine repeats each time the video screen is refreshed, if the low ball goes off the playing field all together or switches positions with the high ball, the playing window will be immediately adjusted so that it includes the active ball that is closest to the control component. If more than one ball may appear on the playing field, the routine determines the active status of each ball, compares the positions of the active balls to determine the lowest ball on the screen, and adjusts the playing window according to the position of the lowest ball.

While preferred embodiments of the invention have been illustrated and described, it will be appreciated that various changes can be made therein without departing from the spirit and scope of the invention. For example, the routine is useful in other video games wherein the playing field has two opposing boundaries and at least one set of control components. For example, in a hockey or tennis-type video game, the routine appears to adjust the playing window from side-to-side rather than up and down. In this example, the routine determines the positions of the ball and generates instructions for adjusting the playing window to include the ball.

The present invention may be used in video games wherein the position of the control component is fixed on the play field but is not necessarily fixed adjacent a boundary of the field. For example, some pinball games include control flippers positioned at mid-field. In one embodiment, using the present invention, two playing windows may be identified for display. One window is related to the mid-field control components and is displayed above the mid-field flippers. The other window is related to the control components at one end of the field and is displayed between those components and the mid-field components. Each window is identified so as to include the playing token in its respective portion of the playing field that is closest to related control component. The playing field identified by each of the playing windows and the two portions of the playing field including the control component can be displayed by the main control program. Alternatively, a screen swapping method may be used to display either the lower control component and related lower playing window or the upper (mid-field) control component and the related upper playing window. The routine determines a playing window position that includes the playing token that is closest to the related control component. The control of the video display in accordance with the playing window identification is carried out by the main program.

Additionally, other program control checks can be carried out by the routine. For example, the routine may check whether a ball is located on a particular part of the playing field that corresponds to a ball trap. If the ball is so located, then the ball is trapped and the routine does not have to perform the playing window adjustment steps.

The embodiments of the invention in which an exclusive property or privilege is claimed are defined as follows:

1. A method for displaying an elongated playing field on a video display wherein the portion of the playing field that can be displayed on the entire video display area is smaller than the whole playing field such that only a portion of the whole playing field can be displayed on the video display at any one time, the playing field having opposing boundaries and including a fixed control component for interacting with playing tokens to cause the tokens to move over the playing field, wherein the tokens move multidirectionally over the playing field, the method including the steps of continuously:
   (a) determining the playing field position of a playing token;
   (b) identifying a position for a playing window on the playing field such that said playing window includes said playing token; and
   (c) displaying said playing window and a portion of the playing field including the control component even when said playing window and said portion of the playing field including the control component are not contiguous portions of the playing field, whereby the control component and said playing token are displayed.

2. A method as claimed in claim 1, in which a plurality of playing tokens appear on the playing field, wherein
   said step of determining the playing field position of a playing token includes determining the field position of each of the plurality of playing tokens; and
   said step of identifying a playing window position includes the steps of determining which of said playing tokens is closest to the control component, and identifying said position of said playing window such that it includes said closet playing token.

3. A method as claimed in claim 1, wherein said playing window includes a pair of window boundaries that are parallel to the playing field boundaries, and wherein said step of identifying said playing window position includes the steps:
   (a) determining a previous playing window position;
   (b) determining whether said playing token is in a central portion of said previous playing window relative to said window boundaries; and
   (c) if said playing token is in said central portion, identifying said playing window position as said previous playing window position.

4. A method as claimed in claim 1, wherein said playing window includes a pair of window boundaries that are parallel to the playing field boundaries, and wherein said step of identifying a playing window position further includes the step of identifying said playing window position such that said playing token is centrally positioned relative to said window boundaries.

5. A method for identifying a playing window position in a playing field in a video display system, wherein the portion of the playing field that can be displayed at one time on the video display is smaller than the entire playing field such that only a portion of the whole playing field can be displayed at any one time, the playing field including opposing boundaries and a fixed control component for interacting with a playing token to cause the playing token to move multidirectionally over the playing field, the video display system including a main program for providing display commands to a video display device, said main program including commands to display a portion of the playing field including the control component and to generate playing field and playing token position information, the method including the steps of continuously:
   (a) determining playing token position information;
   (b) identifying a position for a playing window on the playing field such that said playing window includes said playing token; and
   (c) providing said playing window position to the main program, whereby the main program generates a playing window display command corresponding to said playing window position such that the control component and said playing token are displayed via the video display device even when said playing window and said portion of the playing field including the control component are not contiguous portions of the playing field.

6. A method as claimed in claim 5, in which a plurality of playing tokens appear on the playing field, wherein
   said step of determining the playing field position of a playing token includes determining the field position of each of the plurality of playing tokens; and
   said step of identifying a playing window position includes the steps of identifying from said position information which of said playing tokens is closest to the control component on the playing field, and identifying said position of said playing window such that it includes said closest playing token.

7. A method as claimed in claim 6, wherein the main program further generates token status information,
   said step of determining the playing token position information includes the step of first determining from the main program token status information which of said playing tokens are active on said playing field and
   said step of identifying a playing window position includes determining which of said active playing tokens is said closest token.

8. A method as claimed in claim 5, wherein said playing window includes a pair of window boundaries that are parallel to the playing field boundaries, and wherein said step of identifying said playing window position includes the steps:
   (a) determining a previous playing window position;
   (b) determining whether said playing token is in a central portion and of said previous playing window relative to said window boundaries;
   (c) if said playing token is in said central portion, identifying said playing window position as said previous playing window position.

9. A method as claimed in claim 5, wherein said playing window includes a pair of window boundaries that are parallel to the playing field boundaries, and wherein said step of identifying a playing window position further includes the step of identifying said window position such that said playing token is centrally positioned relative to said window boundaries.

10. An improved interactive video display system for displaying a playing field on a video display, wherein the portion of the playing field that can be displayed on the video display is smaller than the entire playing field, such that only a portion of the whole playing field can be displayed on the video display at any one time, the playing field including opposing boundaries and a fixed control component for interacting with a playing token causing the token to move multidirectionally over the playing field, the system including a controller, a memory component, and an input/output component, such that the memory component stores a main program and playing field data, wherein the playing field data defines the playing field, the controller executes the main program and controls the input/output component so that a playing window portion of the playing field and the portion of the playing field including the control component are displayed even when said playing window and said portion of the playing field including the control component are not contiguous portions of the playing field, the improvement comprising:

(a) means for continuously determining a playing field position of a playing token relative to said control component; and (b) means for continuously identifying a position for a playing window such that said playing window includes said playing token, whereby said playing window is displayed via the input/output component.

11. A system as claimed in claim 10, in which a plurality o playing tokens may appear on the playing field, further including means for identifying which of said playing tokens is closest to said control component, and wherein said means for identifying said playing window position identifies a playing window position such that said playing window includes said closest playing token.

12. A system as claimed in claim 10, wherein said playing window includes a pair of window boundaries that are parallel to the playing field boundaries, and wherein said means for identifying said playing window position includes:

(a) means for determining a previous playing window position; and (b) means for determining whether said playing token is in a central portion of said previous playing window relative to said window boundaries, and, if said playing token is in said central portion, for identifying said playing window position as said previous playing window position.

13. A system as claimed in claim 10, wherein said playing window includes a pair of window boundaries that are parallel to the playing field boundaries, and wherein said means for identifying a playing window position identifies said window position such that said playing token is centrally positioned relative to said window boundaries.

* * * * *

UNITED STATES PATENT AND TRADEMARK OFFICE
CERTIFICATE OF CORRECTION

PATENT NO. : 5,080,377

DATED : January 14, 1992

INVENTOR(S) : Timothy D.J. Stamper et al.

It is certified that error appears in the above-identified patent and that said Letters Patent is hereby corrected as shown below:

| COLUMN | LINE | ERROR |
|---|---|---|
| 2 | 54 | "closet" should read --closest-- |
| 3 | 17 | "th" should read --the-- |
| 5 | 22 | "informartion" should read --information-- |
| 7 | 47 | "closet" should read --closest-- |
| 8 | 57 | after "portion" delete --and-- |
| 8 | 58 | after "boundaries;" insert --and-- |

Signed and Sealed this

First Day of June, 1993

Attest:

MICHAEL K. KIRK

Attesting Officer    Acting Commissioner of Patents and Trademarks